United States Patent [19]
Geis et al.

[11] Patent Number: 5,903,116
[45] Date of Patent: May 11, 1999

[54] TURBOGENERATOR/MOTOR CONTROLLER

[75] Inventors: Everett R. Geis, Trabuco Canyon; Brian W. Peticolas, Redondo Beach, both of Calif.

[73] Assignee: Capstone Turbine Corporation, Tarzana, Calif.

[21] Appl. No.: 08/924,966

[22] Filed: Sep. 8, 1997

[51] Int. Cl.[6] .................................................. H02P 5/20
[52] U.S. Cl. ......................... 318/140; 318/145; 318/147; 318/375
[58] Field of Search .................................. 318/140, 145, 318/147, 375

[56] References Cited

U.S. PATENT DOCUMENTS

| | | |
|---|---|---|
| 2,864,244 | 12/1958 | Prachar . |
| 3,124,942 | 3/1964 | Rothfuss et al. . |
| 3,703,076 | 11/1972 | Hagemeister . |
| 4,265,099 | 5/1981 | Johnson et al. . |
| 4,560,364 | 12/1985 | Cohen . |
| 4,802,882 | 2/1989 | Heidrich . |
| 4,841,216 | 6/1989 | Okada et al. . |
| 4,862,009 | 8/1989 | King . |
| 5,158,504 | 10/1992 | Stocco . |
| 5,250,890 | 10/1993 | Tanamachi et al. . |
| 5,291,106 | 3/1994 | Murty et al. ......................... 318/375 X |
| 5,309,081 | 5/1994 | Shah et al. . |
| 5,363,032 | 11/1994 | Hanson et al. . |
| 5,364,309 | 11/1994 | Heidrich et al. . |
| 5,545,090 | 8/1996 | Kirschey . |
| 5,546,742 | 8/1996 | Shekhawat et al. . |
| 5,581,168 | 12/1996 | Rozman et al. . |
| 5,594,322 | 1/1997 | Rozman et al. . |
| 5,637,987 | 6/1997 | Fattic et al. ......................... 318/375 X |

Primary Examiner—Karen Masih
Attorney, Agent, or Firm—Albert J. Miller

[57] ABSTRACT

A turbogenerator/motor controller with a microprocessor based inverter having multiple modes of operation. To start the turbine, the inverter connects to and supplies fixed current, variable voltage, variable frequency, AC power to the permanent magnet turbogenerator/motor, driving the permanent magnet turbogenerator/motor as a motor to accelerate the gas turbine. During this acceleration, spark and fuel are introduced in the correct sequence, and self-sustaining gas turbine operating conditions are reached. The inverter is then disconnected from the permanent magnet generator/motor, reconfigured to a controlled 60 hertz mode, and then either supplies regulated 60 hertz three phase voltage to a stand alone load or phase locks to the utility, or to other like controllers, to operate as a supplement to the utility. In this mode of operation, the power for the inverter is derived from the permanent magnet generator/motor via high frequency rectifier bridges. The microprocessor monitors turbine conditions and controls fuel flow to the gas turbine combustor.

25 Claims, 3 Drawing Sheets

TURBOGENERATOR/MOTOR CONTROLLER

TECHNICAL FIELD

This invention relates to the general field of power converting systems and more particularly to an improved controller for a turbogenerator/motor.

BACKGROUND OF THE INVENTION

Electric utilities are now grappling with the challenge of deregulation and competition at a time of relatively slow growth in electricity demands. While plans for huge power plants are being shelved because of high costs and environmental concerns, new customers must still be supplied with electrical power. Existing plants and transmission lines are simply becoming overwhelmed in some areas. Nuclear power plants are fast becoming economic dinosaurs.

One alternative to generating electrical power is called a "turbogenerator", a small gas turbine engine combined on a common shaft with an electric generator. When a permanent magnet generator/motor is utilized, the combination is referred to as a permanent magnet turbogenerator/motor.

Intake air is drawn through the permanent magnet turbogenerator/motor by the gas turbine compressor which increases the pressure of the air and forces it into a recuperator which receives exhaust gases from the gas turbine. The recuperator preheats the air before it enters the gas turbine combustor where the preheated air is mixed with fuel and burned. The combustion gases are then expanded in the turbine which drives the compressor and the permanent magnet rotor of the permanent magnet turbogenerator/motor is mounted on the same shaft as the gas turbine and compressor. The expanded turbine exhaust gases are then passed through the recuperator before being discharged from the turbogenerator/motor.

A permanent magnet turbogenerator/motor generally includes a rotor assembly having a plurality of equally spaced magnet poles of alternating polarity around the outer periphery of the rotor or, in more recent times, a solid structure of samarium cobalt or neodymium-iron-boron. The rotor is rotatable within a stator which generally includes a plurality of windings and magnetic poles of alternating polarity. In a generator mode, rotation of the rotor causes the permanent magnets to pass by the stator poles and coils and thereby induces an electric current to flow in each of the coils. Alternately, if an electric current is passed through the stator coils, the energized coils will cause the rotor to rotate and thus the generator will perform as a motor.

A permanent magnet turbogenerator/motor can be utilized to provide electrical power for a wide range of utility, commercial and industrial applications. While an individual permanent magnet turbogenerator may only generate 24 to 50 kilowatts, powerplants of up to 500 kilowatts or greater are possible by linking numerous permanent magnet turbogenerator/motors together. Standby power, peak load shaving power and remote location power are just several of the potential utility applications which these lightweight, low noise, low cost, environmentally friendly, and thermally efficient units can be useful for.

In order to meet the stringent utility requirements, particularly when the permanent magnet turbogenerator/motor is to operate as a supplement to utility power, precise control of the permanent magnet turbogenerator/motor is required.

SUMMARY OF THE INVENTION

The turbogenerator/motor controller of the present invention is a microprocessor based inverter having multiple modes of operation. To start the turbine, the inverter connects to and supplies fixed current, variable voltage, variable frequency, AC power to the permanent magnet turbogenerator/motor, driving the permanent magnet turbogenerator/motor as a motor to accelerate the gas turbine. During this acceleration, spark and fuel are introduced in the correct sequence, and self-sustaining gas turbine operating conditions are reached.

At this point, the inverter is disconnected from the permanent magnet generator/motor, reconfigured to a controlled 60 hertz mode, and then either supplies regulated 60 hertz three phase voltage to a stand alone load or phase locks to the utility, or to other like controllers, to operate as a supplement to the utility. In this mode of operation, the power for the inverter is derived from the permanent magnet generator/motor via high frequency rectifier bridges. The microprocessor monitors turbine conditions and controls fuel flow to the gas turbine combustor.

Since the voltage derived from the permanent magnet generator/motor is a function of rotational speed and the load, inverter input voltage requirements limit the operational speed of the gas turbine from approximately 72,000 rpm to a top speed of 96,000 rpm. The inverter is direct coupled to the utility, therefor the inverter voltage rating is established by the utility for grid connect operation, and has a narrow range for stand alone operation.

BRIEF DESCRIPTION OF THE DRAWINGS

Figure 1:
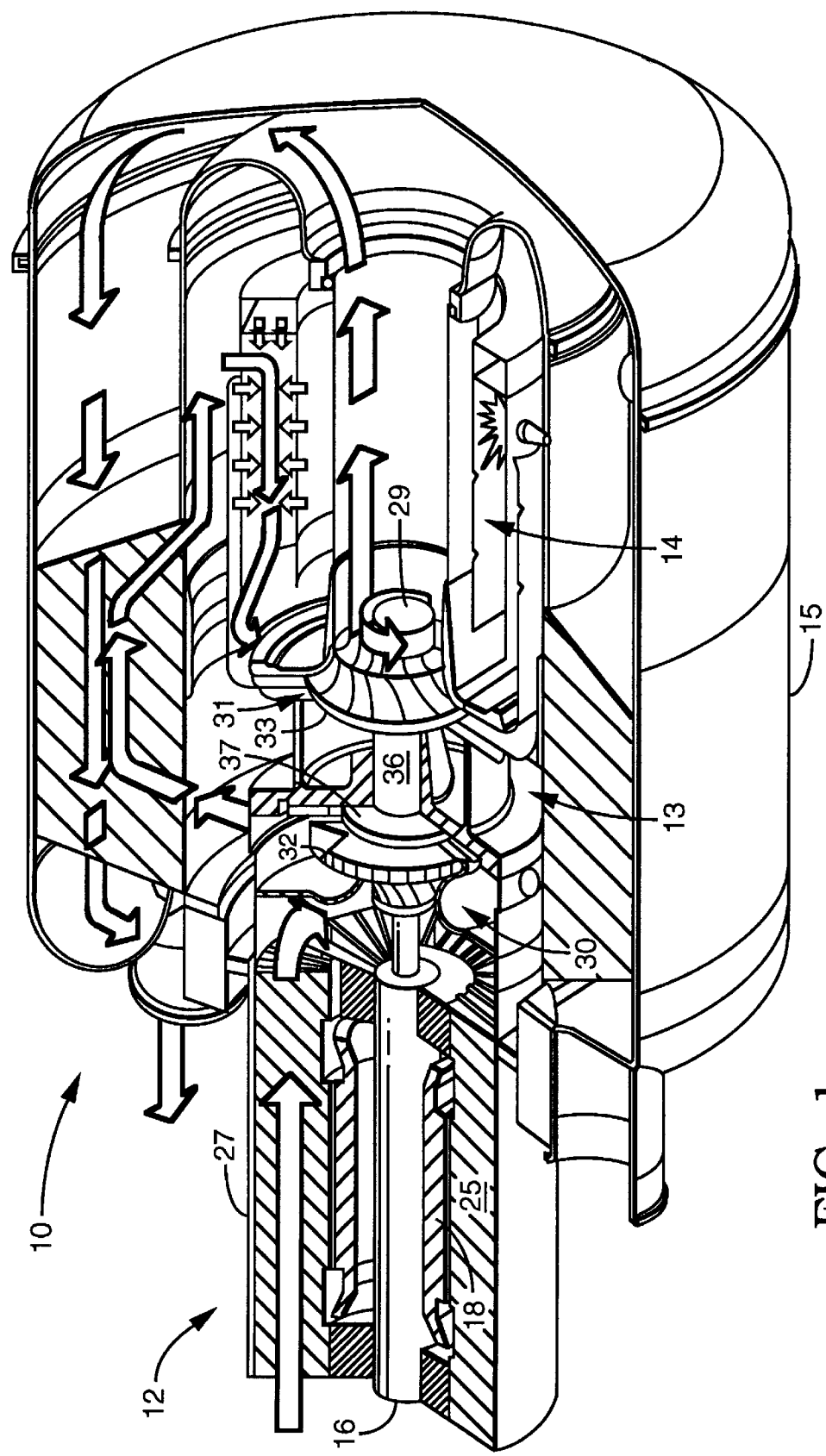
Figure 2:
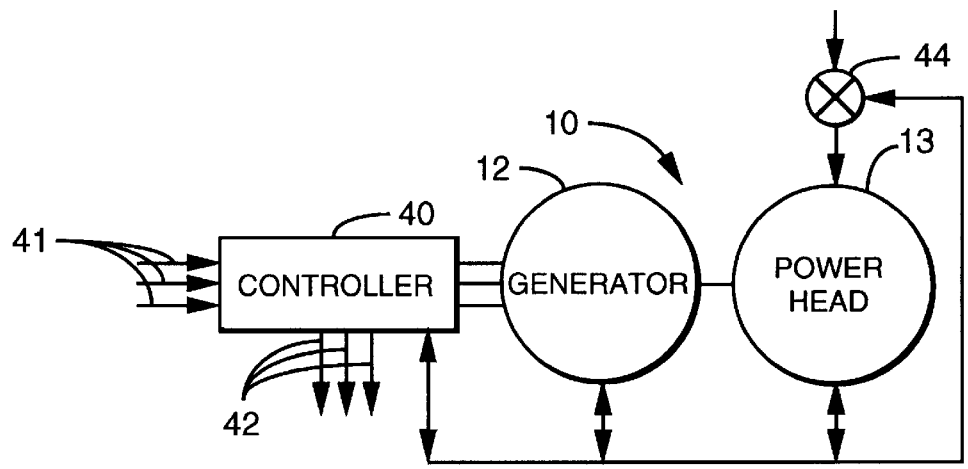
Figure 3:
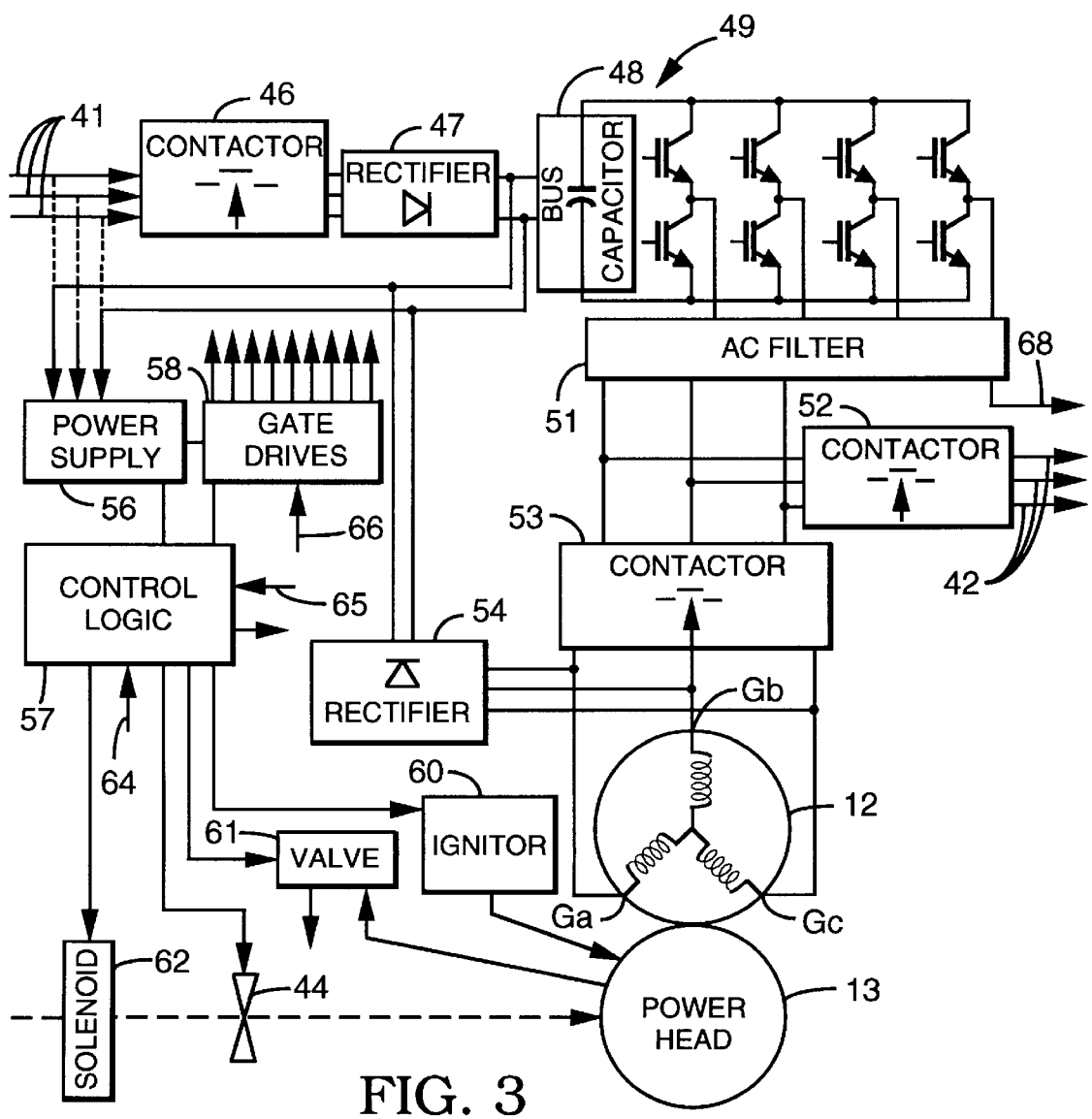
Figure 4:
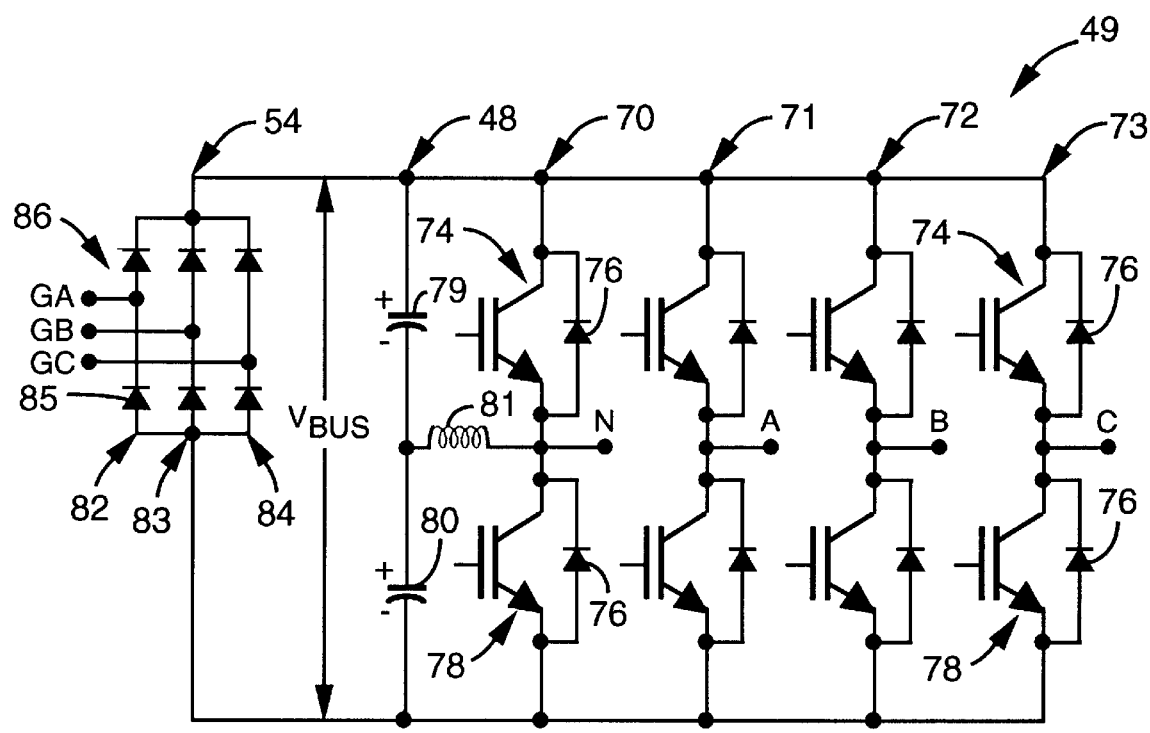

Having thus described the present invention in general terms, reference will now be made to the accompanying drawings in which:

FIG. 1 is a perspective view, partially cut away, of a permanent magnet turbogenerator/motor utilizing the controller of the present invention;

FIG. 2 is a functional block diagram of the interface between the permanent magnet turbogenerator/motor of FIG. 1 and the controller of the present invention;

FIG. 3 is a functional block diagram of the permanent magnet turbogenerator/motor controller of the present invention; and FIG. 4 is a circuit diagram of the PWM inverter of the permanent magnet turbogenerator/motor controller of the present invention.

DETAILED DESCRIPTION OF THE PREFERRED EMBODIMENTS

A permanent magnet turbogenerator/motor 10 is illustrated in FIG. 1 as an example of a turbogenerator/motor utilizing the controller of the present invention. The permanent magnet turbogenerator/motor 10 generally comprises a permanent magnet generator 12, a power head 13, a combustor 14 and a recuperator (or heat exchanger) 15.

The permanent magnet generator 12 includes a permanent magnet rotor or sleeve 16, having a permanent magnet disposed therein, rotatably supported within a stator 18 by a pair of spaced journal bearings. Radial stator cooling fins 25 are enclosed in an outer cylindrical sleeve 27 to form an annular air flow passage which cools the stator 18 and thereby preheats the air passing through on its way to the power head 13.

The power head 13 of the permanent magnet turbogenerator/motor 10 includes compressor 30, turbine 31, and bearing rotor 36 through which the tie rod 29 passes. The compressor 30, having compressor impeller or wheel 32 which receives preheated air from the annular air flow passage in cylindrical sleeve 27 around the stator 18, is driven by the turbine 31 having turbine wheel 33 which receives heated exhaust gases from the combustor 14 supplied with air from recuperator 15. The compressor wheel 32 and turbine wheel 33 are rotatably supported by bearing shaft or rotor 36 having radially extending bearing rotor thrust disk 37. The bearing rotor 36 is rotatably supported by a single journal bearing within the center bearing housing while the bearing rotor thrust disk 37 at the compressor end of the bearing rotor 36 is rotatably supported by a bilateral thrust bearing. The bearing rotor thrust disk 37 is adjacent to the thrust face at the compressor end of the center bearing housing while a bearing thrust plate is disposed on the opposite side of the bearing rotor thrust disk 37 relative to the center housing thrust face.

Intake air is drawn through the permanent magnet generator 12 by the compressor 30 which increases the pressure of the air and forces it into the recuperator 15. In the recuperator 15, exhaust heat from the turbine 31 is used to preheat the air before it enters the combustor 14 where the preheated air is mixed with fuel and burned. The combustion gases are then expanded in the turbine 31 which drives the compressor 30 and the permanent magnet rotor 16 of the permanent magnet generator 12 which is mounted on the same shaft as the turbine 31. The expanded turbine exhaust gases are then passed through the recuperator 15 before being discharged from the turbogenerator/motor 10.

A functional block diagram of the interface between the generator controller 40 and the permanent magnet turbogenerator/motor 10 for stand alone operation is illustrated in FIG. 2. The generator controller 40 receives power 41 from a source such as a utility to operate the permanent magnet generator 12 as a motor to start the turbine 31 of the power head 13. During the start sequence, the utility power 41 is rectified and a controlled frequency ramp is supplied to the permanent magnet generator 12 which accelerates the permanent magnet rotor 16 and the compressor wheel 32, bearing rotor 36 and turbine wheel 33. This acceleration provides an air cushion for the air bearings and airflow for the combustion process. At about 12,000 rpm, spark and fuel are provided and the generator controller 40 assists acceleration of the turbogenerator 10 up to about 40,000 rpm to complete the start sequence. The fuel control valve 44 is also regulated by the generator controller 40.

Once self sustained operation is achieved, the generator controller 40 is reconfigured to produce 60 hertz, three phase AC (208 volts) 42 from the rectified high frequency AC output (280–380 volts) of the high speed permanent magnet turbogenerator 10. The permanent magnet turbogenerator 10 is commanded to a power set-point with speed varying as a function of the desired output power. For grid connect applications, output 42 is connected to input 41, and these terminals are then the single grid connection.

The functional blocks internal to the generator controller 40 are illustrated in FIG. 3. The generator controller 40 includes in series the start power contactor 46, rectifier 47, DC bus capacitors 48, pulse width modulated (PWM) inverter 49, AC output filter 51, output contactor 52, generator contactor 53, and permanent magnet generator 12. The generator rectifier 54 is connected from between the rectifier 47 and bus capacitors 48 to between the generator contactor 53 and permanent magnet generator 12. The AC power output 42 is taken from the output contactor 52 while the neutral is taken from the AC filter 51.

The control logic section consists of control power supply 56, control logic 57, and solid state switched gate drives illustrated as integrated gate bipolar transistor (IGBT) gate drives 58, but may be any high speed solid state switching device. The control logic 57 receives a temperature signal 64 and a current signal 65 while the IGBT gate drives 58 receive a voltage signal 66. The control logic 57 sends control signals to the fuel cutoff solenoid 62, the fuel control valve 44, the ignitor 60 and release valve 61. AC power 41 is provided to both the start power contactor 46 and in some instances directly to the control power supply 56 in the control logic section of the generator controller 40 as shown in dashed lines.

Utility start power 41, (for example, 208 AC voltage, 3 phase, 60 hertz), is connected to the start power contactor 46 through fuses (not shown). The start power contactor 46 may consist of a first normally open relay and a second normally closed relay, both of which are de-energized at start up. Alternately, both relays may be normally open and the control power supply 56 receives input directly from utility power input 41. Flameproof power resistors can parallel the relays to provide a reduced current (approximately 10 amps maximum) to slowly charge the internal bus capacitors 48 through the rectifier 47 to avoid drawing excessive inrush current from the utility.

Once the bus capacitors 48 are substantially charged, (to approximately 180 VDC, or 80% of nominal), the control power supply 56 starts to provide low voltage logic levels to the control logic 57. Once the control logic microprocessor has completed self tests, coil power is provided to first normally open relay of the start power contactor 46 to fully charge the bus capacitors 48 to full peak line voltage. The bus capacitors 48 can be supplemented for high frequency filtering by additional film type (dry) capacitors.

The PWM inverter 49 is illustrated in more detail in FIG. 4. This inverter 49 illustrates four IGBT channels 70, 71, 72, and 73 each across the voltage bus $V_{bus}$, but as stated previously, these channels may be any number or type of solid state switching devices. Each IGBT channel 70, 71, 72, and 73 includes an upper IGTB 74 and an anti parallel diode 76 and a lower IGBT 78 and an identical anti parallel diode 76.

The PWM inverter 49 also includes a capacitor channel 48 across the voltage bus $V_{bus}$. The capacitor channel 48 includes upper capacitor 79 and lower capacitor 80 with the midpoint between upper capacitor 79 and lower capacitor 80 connected to the midpoint of IGBT channel 70 through inductor 81. The neutral connection N or 68 is at the midpoint of IGBT channel 70 while the midpoints of IGBT channels 71, 72, and 73 provide output connections A, B, and C, respectively of output 42. The neutral connection N or 68 may not be required for all applications.

In addition, the PWM inverter 49 includes a rectifier block channel 54 which is also across the voltage bus $V_{bus}$. This rectifier block channel 54 includes a three phase rectifier block 86 having three (3) diode channels 82, 83, and 84 each including a pair of diodes 85. The midpoints of each pair of diodes 85 are connected to generator windings $G_A$, $G_B$, and $G_C$, respectively.

The control logic 57 sequentially drives the IGBT switches of the PWM inverter 49 via the IGBT gate drives 58. Six of the IGBT switches, those in channels 71, 72 and 73 are operated at a high frequency and modulated in classic PWM manner to provide sinusoidal output via the AC output filter 51. The other 2 IGBT switches of the PWM inverter 49, both in channel 70, are switched at a 50% duty cycle to create an artificial neutral 68 and balancing the voltage on the pair of capacitors 79 and 80. The current in the neutral 68 will consist of a relatively small, high frequency, triangle pulse, plus whatever 60 hertz component exists as a result of unbalanced load currents in the 60 hertz generator mode.

The PWM inverter 49 operates in two basic modes: a variable voltage (0–190 V line to line), variable frequency (0–700 hertz) constant volts per hertz, three phase mode to drive the permanent magnet generator/motor 12 for start up or cooldown when the generator contactor 52 is closed; or a constant voltage (120 V line to neutral per phase), constant frequency three phase 60 hertz mode. The control logic 57 and IGBT gate drives 58 receive feedback via current signal 65 and voltage signal 66, respectively, as the turbine generator is ramped up in speed to complete the start sequence. The PWM inverter 49 is then reconfigured to provide 60 hertz power, either as a current source for grid connect, or as a voltage source.

The AC filter 51 consists of three iron core inductors and three capacitors to remove the high frequency switching component. The nominal current for each AC filter inductor will be fundamental load current at 60 hertz, plus a small high frequency component. The output of the AC filter 51 is connected to the load via the output contactor 52 when the PWM inverter 49 is in 60 hertz output mode. The output contactor 52 is energized from the output of the PWM inverter 49 via a relay.

The generator contactor 53 connects the permanent magnet generator 12 to the inverter 49 during the start sequence. Initial starting current approximates nominal operating current for about 2 seconds then reduces to a lower value for the balance of the acceleration period. After the start sequence is completed, the generator 12 produces enough output voltage at the output terminals of the generator rectifier 54 to provide three phase regulated output from the inverter 49, so both the start contactor 46 and generator contractor 53 are opened and the system is then self sustaining.

The IGBT gate drives 58 have five sections, four identical gate drive circuits with one for each of the four dual IGBT's and another section consisting of precision resistive (fixed impedance) voltage dividers with integrated circuit amplifiers. Each gate drive section consists of two transformer isolated power supplies driven from a logic level high frequency (~50 kilohertz) driver circuit, two integrated solid state driver circuits and additional optical isolators. One circuit operates referenced to the center point of the two IGBT transistors and the other operates referenced to the negative bus potential. There are two axial lead high voltage diodes which provide "on-state" sensing, and signal control circuits in the event that the associated semiconductor switching device reflects an "on-state" voltage greater than about 10 volts.

The precision resistive divider circuits consist of two metal film type fixed resistors connected in series. A low resistive element provides the low voltage pick-off point, as an example, the inverter output sensor is typically a ~40 to 1 divider for the 120 V RMS inverter output voltage, providing a low voltage reference signal at the junction of the precision resistive divider circuits. This signal is buffered by a solid state operational amplifier. In the event one of the high voltage resistors were to fail shorted, the other is capable of standing off the voltage and preventing component damage and/or hazardous conditions from occurring at other locations within the control logic 57.

The control power supply 56 is really a two stage power converter. The first stage, consisting of semiconductors and related components, is a 400 VDC to 24 VDC isolated converter. The isolation is a function of the transformer and optically isolated components which link the high voltage side components with the 24 VDC regulated side. The second stage, also consisting of semiconductors and related components, is a 24 VDC to ±12 VDC, 12 VDC, and 5 VDC isolated converter. As with the first stage, the isolation is a function of the transformer and optically coupled sensors.

During startup of the permanent magnet turbogenerator/motor 10, both the start power contactor 46 and the generator contactor 53 are closed and the output contactor 52 is open. Once self sustained operation is achieved, the start power contactor 46 and the generator contactor 53 are opened and the PWM inverter 49 is reconfigured to a controlled 60 hertz mode. After the reconfiguration of the PWM inverter 49, the output contactor 52 is closed to connect the AC output 42. The start power contactor 46 and generator contactor 53 will remain open.

The PWM inverter 49 is truly a dual function inverter which is used both to start the permanent magnet turbogenerator/motor 10 and is also used to convert the permanent magnet turbogenerator/motor output to utility power, either sixty hertz, three phase for stand alone applications, or as a current source device. With start power contactor 46 closed, single or three phase utility power is brought through the start power contactor 46 to be able to operate into a bridge rectifier 47 and provide precharged power and then start voltage to the bus capacitors 48 associated with the PWM inverter 49. This allows the PWM inverter 49 to function as a conventional adjustable speed drive motor starter to ramp the permanent magnet turbogenerator/motor 10 up to a speed sufficient to start the gas turbine 31.

An additional rectifier 54, which operates from the output of the permanent magnet turbogenerator/motor 10, accepts the three phase, up to 380 volt AC from the permanent magnet generator /motor 12 which at full speed is 1600 hertz and is classified as a fast recovery diode rectifier bridge. Six diode elements arranged in a classic bridge configuration comprise this high frequency rectifier 54 which provides output power at DC. The rectified voltage is as high as 550 volts under no load.

The permanent magnet turbogenerator/motor 10 is basically started at zero frequency and rapidly ramps up to approximately 12,000 rpm. This is a two pole permanent magnet generator/motor 12 and as a result 96,000 rpm equals 1,600 hertz. Therefore 12,000 rpm is ⅛th of that or 200 hertz. It is operated on a constant volt per hertz ramp, in other words, the voltage that appears at the output terminals is ⅛th of the voltage that appears at the output terminals under full speed.

Approximate full speed voltage is 380 volts line to line so it would be approximately ⅛th of that. When the PWM inverter 49 has brought the permanent magnet turbogenerator/motor 10 up to speed, the fuel solenoid 62, fuel control valve 44 and ignitor 60 cooperate to allow the combustion process to begin. Using again the adjustable speed drive portion capability of the PWM inverter 49, the permanent magnet turbogenerator/motor 10 is then accelerated to approximately 35,000 or 40,000 rpm at which speed the gas turbine 31 is capable of self sustaining operation.

The AC filter 51 is a conventional single pass LC filter which simply removes the high frequency, in this case approximately twenty kilohertz, switching component. Because the voltage in start mode is relatively low, its rectified 208 volt line which is approximately 270 volts, a single bus capacitor 48 is capable of standing that voltage. However, when in generate mode, the DC output of the generator rectifier 54 can supply voltages as high as 550 volts DC, requiring two capacitors to be series connected to sustain that voltage.

The two IGBTs 74 and 78 in IGBT channel 70 function in the generate mode to form a constant duty fifty percent duty cycle divider to maintain exactly half bus voltage at the center tap at all times. That center tap point forms the neutral for the AC output. The neutral is not required for generator starting but is required for utility interface. The IGBT channels 71, 72, and 73 form a classic six transistor PWM inverter.

The reconfiguration or conversion of the PWM inverter 49 to be able to operate as a current source synchronous with the utility grid is accomplished by first stopping the PWM inverter 49. The AC output or the grid connect point is monitored with a separate set of logic monitoring to bring the PWM inverter 49 up in a synchronized fashion. The generator contactor 53 functions to close and connect only when the PWM inverter 49 needs to power the permanent magnet turbogenerator/motor 10 which is during the start operation and during the cool down operation. The output contactor 52 is only enabled to connect the PWM inverter 49 to the grid once the PWM inverter 49 has synchronized with grid voltage.

The implementation of the control power supply 56 first drops the control power supply 56 down to a 24 volt regulated section to allow an interface with a battery or other control power device. The control power supply 56 provides the conventional logic voltages to both the IGBT gate drives 58 and control logic 57. The IGBT gate drives 58 have two isolated low voltage sources to provide power to each of the two individual IGBT drives and the interface to the IGBT transistors is via a commercially packaged chip.

This system is also capable of generating 480 volt output directly. By changing the winding in the permanent magnet generator/motor 12, the voltage ratings of the IGBTs, and the bus capacitors 48, the system is then capable of operating directly at 480 volts, starting from grid voltage with 480 volts, and powering directly to 480 volts without requiring a transformer.

While specific embodiments of the invention have been illustrated and described, it is to be understood that these are provided by way of example only and that the invention is not to be construed as being limited thereto but only by the proper scope of the following claims.

What we claim is:

1. A method of controlling a permanent magnet turbogenerator/motor comprising the steps of:

providing electrical power to the permanent magnet turbogenerator/motor through a pulse width modulated inverter to start the permanent magnet turbogenerator/motor to achieve self sustaining operation of the permanent magnet turbogenerator/motor;

disconnecting the electrical power from the pulse width modulated inverter once self sustaining operation of the permanent magnet turbogenerator/motor is achieved; and reconfiguring the pulse width modulated inverter to supply voltage from the permanent magnet turbogenerator/motor.

2. The method of controlling a permanent magnet turbogenerator/motor of claim 1 wherein the voltage supplied from the pulse width modulated inverter of the permanent magnet turbogenerator/motor is utility frequency voltage.

3. The method of controlling a permanent magnet turbogenerator/motor of claim 1 wherein the pulse width modulated inverter includes four solid state switching device channels, and three of the four solid state switching device channels are reconfigured to supply utility frequency voltage and the fourth solid state switching device channel is switched at a fifty percent duty cycle to create an artificial neutral.

4. A method of controlling a permanent magnet turbogenerator/motor comprising the steps of:

providing electrical power to the permanent magnet turbogenerator/motor through a pulse width modulated inverter to drive the permanent magnet turbogenerator/motor as a motor to accelerate the gas turbine engine of the permanent magnet turbogenerator/motor;

providing spark and fuel to the gas turbine engine of the permanent magnet turbogenerator/motor during this acceleration to achieve self sustaining operation of the gas turbine engine;

disconnecting the electrical power from the pulse width modulated inverter once self sustaining operation is achieved; and reconnecting the pulse width modulated inverter to the permanent magnet turbogenerator/motor through a rectifier bridge to reconfigure the pulse width modulated inverter to supply utility frequency voltage.

5. The method of controlling a permanent magnet turbogenerator/motor of claim 4 wherein the pulse width modulated inverter includes four solid state switching device channels, and three of the four solid state switching device channels are reconfigured to supply utility frequency voltage and the fourth solid state switching device channel is switched at a fifty percent duty cycle to create an artificial neutral.

6. A method of controlling a permanent magnet turbogenerator/motor comprising the steps of:

providing electrical power to the permanent magnet turbogenerator/motor through a first contactor and a pulse width modulated inverter to drive the permanent magnet turbogenerator/motor as a motor through a second contactor to accelerate the gas turbine engine of the permanent magnet turbogenerator/motor;

providing spark and fuel to the gas turbine engine of the permanent magnet turbogenerator/motor during this acceleration to achieve self sustaining operation of the gas turbine engine;

opening the first and second contactors to disconnect the electrical power from the pulse width modulated inverter once self sustaining operation is achieved; and reconnecting the pulse width modulated inverter to the permanent magnet turbogenerator/motor through a rectifier bridge to reconfigure the pulse width modulated inverter to supply utility frequency voltage.

7. The method of controlling a permanent magnet turbogenerator/motor of claim 6 wherein the pulse width modulated inverter includes four solid state switching device channels, and three of the four solid state switching device channels are reconfigured to supply utility frequency voltage and the fourth solid state switching device channel is switched at a fifty percent duty cycle to create an artificial neutral.

8. The method of controlling a permanent magnet turbogenerator/motor of claim 6 and in addition the step of connecting the reconfigured pulse width modulated inverter to a load by closing a third contactor.

9. A method of controlling a permanent magnet turbogenerator/motor comprising the steps of:

providing electrical power to the permanent magnet turbogenerator/motor through a first contactor and a multiple solid state switching device channel pulse width modulated inverter to drive the permanent magnet turbogenerator/motor as a motor through a second contactor to accelerate the gas turbine engine of the permanent magnet turbogenerator/motor;

providing spark and fuel to the gas turbine engine of the permanent magnet turbogenerator/motor during this acceleration to achieve self sustaining operation of the gas turbine engine;

opening the first and second contactors to disconnect the electrical power from the multiple solid state switching device channel pulse width modulated inverter once self sustaining operation is achieved;

reconnecting the multiple solid state switching device channel pulse width modulated inverter to the permanent magnet turbogenerator/motor through a high frequency rectifier bridge to reconfigure the multiple solid state switching device channel pulse width modulated inverter; and connecting the reconfigured multiple solid state switching device channel pulse width modulated inverter to utility power by closing a third contactor.

10. The method of controlling a permanent magnet turbogenerator/motor of claim 9 wherein the number of multiple solid state switching device channels in said pulse width modulated inverter is four, and three of the four solid state switching device channels are reconfigured to supply utility frequency voltage and the fourth solid state switching device channels is switched at a fifty percent duty cycle to create an artificial neutral.

11. The method of controlling a permanent magnet turbogenerator/motor of claim 10 wherein the four solid state switching device channels are IGBT channels.

12. The method of controlling a permanent magnet turbogenerator/motor of claim 9 wherein the high frequency rectifier bridge is a three phase rectifier having three diode channels.

13. The method of controlling a permanent magnet turbogenerator/motor of claim 12 wherein each of said three diode channels include a pair of diodes.

14. A controller for a permanent magnet turbogenerator/motor, comprising:

a pulse width modulated inverter operably associated with said permanent magnet turbogenerator/motor;

means to provide electrical power to said permanent magnet turbogenerator/motor through said pulse width modulated inverter to start said permanent magnet turbogenerator/motor to achieve self sustaining operation of said permanent magnet turbogenerator/motor;

means to disconnect the electrical power from said pulse width modulated inverter once self sustaining operation of said permanent magnet turbogenerator/motor is achieved; and means to reconfigure said pulse width modulated inverter to supply voltage from said permanent magnet turbogenerator/motor.

15. The controller for a permanent magnet turbogenerator/motor of claim 14 wherein said pulse width modulated inverter includes a plurality of solid state switching device channels.

16. A controller for a permanent magnet turbogenerator/motor, comprising:

a pulse width modulated inverter operably associated with said permanent magnet turbogenerator/motor, said pulse width modulated inverter having four solid state switching device channels;

means to provide electrical power to said permanent magnet turbogenerator/motor through said pulse width modulated inverter to start said permanent magnet turbogenerator/motor to achieve self sustaining operation;

means to disconnect the electrical power from said pulse width modulated inverter once self sustaining operation of said permanent magnet turbogenerator/motor is achieved; and means to reconfigure said pulse width modulated inverter to supply voltage from said permanent magnet turbogenerator/motor, and three of the four solid state switching device channels are reconfigured to supply utility frequency voltage and the fourth solid state switching device channel is switched at a fifty percent duty cycle to create an artificial neutral.

17. The controller for a permanent magnet turbogenerator/motor of claim 16 wherein said four solid state switching device channels are IGBT channels.

18. The controller for a permanent magnet turbogenerator/motor of claim 14 wherein the voltage supplied from said pulse width modulated inverter associated with said permanent magnet turbogenerator/motor is utility frequency voltage.

19. A controller for a permanent magnet turbogenerator/motor having a gas turbine engine, comprising:

a pulse width modulated inverter operably associated with said permanent magnet turbogenerator/motor;

means to provide electrical power to said permanent magnet turbogenerator/motor through said pulse width modulated inverter to drive said permanent magnet turbogenerator/motor as a motor to accelerate said gas turbine engine of said permanent magnet turbogenerator/motor;

means to provide spark and fuel to said gas turbine engine of said permanent magnet turbogenerator/motor during this acceleration to achieve self sustaining operation of said gas turbine engine;

means to disconnect the electrical power from said pulse width modulated inverter and said permanent magnet turbogenerator/motor once self sustaining operation of said gas turbine engine is achieved;

a rectifier bridge operably associated with said pulse width modulated inverter and said permanent magnet turbogenerator/motor; and means to reconnect said pulse width modulated inverter to said permanent magnet turbogenerator/motor through said rectifier bridge to reconfigure said pulse width modulated inverter to supply utility frequency voltage.

20. The controller for a permanent magnet turbogenerator/motor having a gas turbine engine of claim 19 wherein said pulse width modulated inverter includes four solid state switching device channels, and three of the four solid state switching device channels are reconfigured to supply utility frequency voltage and the fourth solid state switching device channel is switched at a fifty percent duty cycle to create an artificial neutral.

21. A controller for a permanent magnet turbogenerator/motor having a gas turbine engine and a permanent magnet generator/motor, comprising:

a pulse width modulated inverter operably associated with said permanent magnet turbogenerator/motor, said pulse width modulated inverter having a plurality of solid state switching device channels;

a first contactor operably associated with said pulse width modulated inverter;

a second contactor operable associated with said the permanent magnet turbogenerator/motor;

means to provide electrical power to said pulse width modulated inverter through said first contactor when closed to drive said permanent magnet turbogenerator/motor as a motor through said second contactor when closed to accelerate said gas turbine engine of said permanent magnet turbogenerator/motor;

means to provide spark and fuel to said gas turbine engine of said permanent magnet turbogenerator/motor during this acceleration to achieve self sustaining operation of said gas turbine engine;

means to open said first and second contactors to disconnect the electrical power from said pulse width modulated inverter once self sustaining operation is achieved;

a rectifier bridge operable associated with said pulse width modulated inverter and said permanent magnet turbogenerator/motor;

a third contactor operably associated with said pulse width modulated inverter;

means to reconnect said pulse width modulated inverter to said permanent magnet turbogenerator/motor through said rectifier bridge to reconfigure said pulse width modulated inverter; and means to connect said reconfigured pulse width modulated inverter to supply utility frequency voltage to a load through said third contactor when closed.

22. The controller for a permanent magnet turbogenerator/motor of claim 21 wherein the number of solid state switching device channels in said pulse width modulate inverter is four, and three of the four solid state switching device channels are reconfigured to supply utility frequency voltage and the fourth solid state switching device channel is switched at a fifty percent duty cycle to create an artificial neutral.

23. The controller for a permanent magnet turbogenerator/motor of claim 22 wherein the four solid state switching device channels are IGBT channels.

24. The controller for a permanent magnet turbogenerator/motor of claim 21 wherein said rectifier bridge is a three phase rectifier having three diode channels.

25. The controller for a permanent magnet turbogenerator/motor of claim 24 wherein each of said three diode channels includes a pair of diodes.

* * * * *